United States Patent
Wing

(10) Patent No.: US 8,612,592 B2
(45) Date of Patent: Dec. 17, 2013

(54) PROTECTED DEVICE INITIATED PINHOLE CREATION TO ALLOW ACCESS TO THE PROTECTED DEVICE IN RESPONSE TO A DOMAIN NAME SYSTEM (DNS) QUERY

(75) Inventor: Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 12/358,328

(22) Filed: Jan. 23, 2009

(65) Prior Publication Data

US 2010/0191863 A1     Jul. 29, 2010

(51) Int. Cl.
*G06F 13/00* (2006.01)

(52) U.S. Cl.
USPC ............ 709/225; 709/219; 709/227; 709/249

(58) Field of Classification Search
USPC ......... 709/217, 218, 219, 223, 225, 250, 227, 709/249
See application file for complete search history.

(56) References Cited

U.S. PATENT DOCUMENTS

| | | | |
|---|---|---|---|
| 5,898,830 A * | 4/1999 | Wesinger et al. | 726/15 |
| 7,321,598 B2 * | 1/2008 | Blanchet et al. | 370/466 |
| 7,366,188 B2 * | 4/2008 | Kim | 370/401 |
| 7,609,701 B2 * | 10/2009 | Yang et al. | 370/395.52 |
| 2001/0006523 A1 * | 7/2001 | Kriens | 370/401 |
| 2003/0014541 A1 * | 1/2003 | Poeluev | 709/245 |
| 2004/0139227 A1 * | 7/2004 | Takeda | 709/245 |
| 2005/0066041 A1 * | 3/2005 | Chin et al. | 709/228 |

OTHER PUBLICATIONS

Barrett David, "Re: Dynamic DNS as rendezvous service: msg#00061," Sep. 9, 2007, http://osdir.com/ml/network.peer-to-peer.p2p-hackers/2007-09-msg00061,html.
Cheshire et al., "NAT Port Mapping Protocol (NAT-PMP)," <draft-cheshire-nat-pmp-03.txt>, Internet Engineering Task Force, Apr. 2008, 28 pages.
Woodyatt, Ed., "Recommended Simple Security Capabilities in Customer Premises Equipment for Providing Residential IPv6 Internet Service," draft-ietf-v6ops-cpe-simple-security-03, Internet Engineering Task Force, Jul. 29, 2008, 32 pages.
Wing et al., "Discovering, Querying, and Controlling Firewalls and NATs," draft-wing-behave-nat-control-stun-usage-05, Internet Engineering Task Force, Oct. 16, 2007, 31 pages.
Mockapetris, "Domain Names—Implementation and Specification," RFC 1035, The Internet Society, Nov. 1987, 55 pages.
Elz, "A Compact Representation of IPv6 Addresses," RFC 1924, The Internet Society, Apr. 1996, 6 pages.

(Continued)

*Primary Examiner* — Viet Vu
(74) *Attorney, Agent, or Firm* — The Law Office of Kirk D. Williams

(57) ABSTRACT

Disclosed are, inter alia, methods, apparatus, computer-storage media, mechanisms, and means associated with a protected device initiating a pinhole through a network address translator and/or firewall to allow access to the protected device in response to a Domain Name System (DNS) query. In response to a received DNS query from a domain name system (DNS) server, an apparatus requests a traffic pinhole be created in a firewall or network address translator for allowing traffic initiated from a device, on another side of the firewall or said network address translator from the apparatus, to reach the apparatus.

23 Claims, 4 Drawing Sheets

(56) References Cited

OTHER PUBLICATIONS

Vixie et al., "Dynamic Updates in the Domain Name System (DNS Update)," RFC 2136, The Internet Society, Apr. 1997, 26 pages.

Eastlake, "Secure Domain Name System Dynamic Update," RFC 2137, The Internet Society, Apr. 1997, 11 pages.

Tsirtsis & Srisuresh, "Network Address Translation—Protocol Translation (NAT-PT)," RFC 2766, The Internet Society, Feb. 2000, 21 pages.

Gulbrandsen et al., "A DNS RR for specifying the location of services (DNS SRV)," RFC 2782, The Internet Society, Feb. 2000, 12 pages.

Narten et al., "Privacy Extensions for Stateless Address Autoconfiguration in IPv6," RFC 4941, The Internet Society, Sep. 2007, 23 pages.

Crocker & Overell, eds., "Augmented BNF for Syntax Specifications: ABNF," RFC 5234, The Internet Society, Jan. 2008, 16 pages.

* cited by examiner

PROTECTED DEVICE INITIATED PINHOLE CREATION TO ALLOW ACCESS TO THE PROTECTED DEVICE IN RESPONSE TO A DOMAIN NAME SYSTEM (DNS) QUERY

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

In computer networking, network address translation (NAT) is the process of modifying network address information in datagram packet headers while in transit across a traffic routing device for the purpose of remapping a given address space into another. Most often today, NAT is used in conjunction with network masquerading which is a technique that hides an entire address space, usually consisting of private network addresses, behind a single IP address in another, often public address space. This mechanism is implemented in a routing device that uses stateful translation tables to map the "hidden" addresses into a single address and then rewrites the outgoing Internet Protocol (IP) packets on exit so that they appear to originate from the router. In the reverse communications path, responses are mapped back to the originating IP address using the rules ("state") stored in the translation tables. The translation table rules established in this fashion are flushed after a short period without new traffic refreshing their state. As described, the method only allows transit traffic through the router when it is originating in the masqueraded network, since this establishes the translation tables. However, most NAT devices today allow the network administrator to configure translation tables entries for permanent use. This feature is often referred to as "static NAT" or port forwarding and allows traffic originating in the 'outside' network to reach designated hosts in the masqueraded network.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
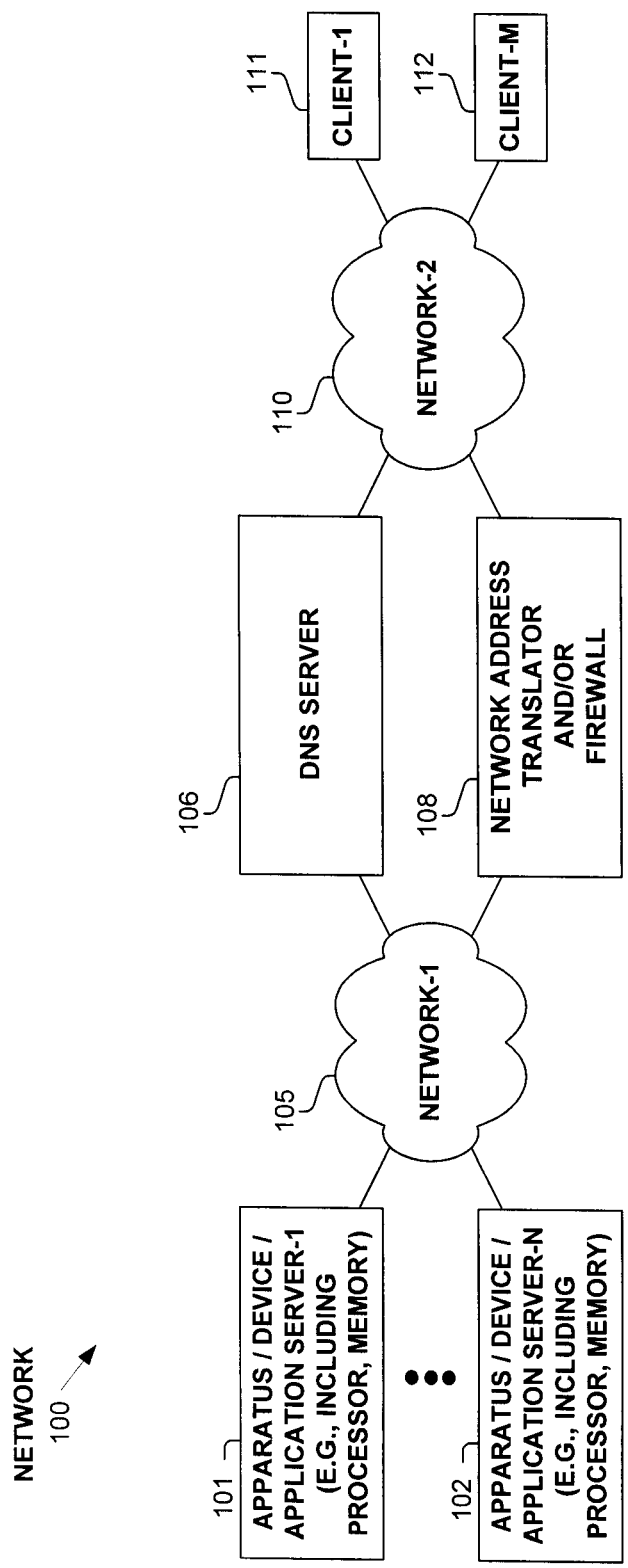
FIG. 1A illustrates a network operating according to one embodiment.

Disclosed are, inter alia, methods, apparatus, computer-storage media, mechanisms, and means associated with a protected device initiating a pinhole through a network address translator and/or firewall to allow access to the protected device in response to a Domain Name System (DNS) query. In one embodiment, in response to a received DNS query from a domain name system (DNS) server, an apparatus requests a traffic pinhole be created in a firewall or network address translator for allowing traffic initiated from a device, on another side of the firewall or said network address translator from the apparatus, to reach the apparatus.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x"

and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

One embodiment includes an apparatus comprising one or more processors and memory, wherein the memory stores one or more instructions that, when executed by said one or more processors, perform operations comprising: in response to a received DNS query from a domain name system (DNS) server, requesting a traffic pinhole be created in a firewall or network address translator for allowing traffic initiated from a device, on another side of the firewall or said network address translator from the apparatus, to reach the apparatus. In one embodiment, the traffic pinhole is through said network address translator. In one embodiment, wherein said operations include: responding to said received DNS query by providing, to the DNS server, a transport address received from said network address translator in response to said request to create the traffic pinhole through said network address translator. In one embodiment, the transport address includes an Internet Protocol (IP) address and port number. In one embodiment, the traffic pinhole is through the firewall. In one embodiment, said operations include: responding to said received DNS query by providing, to the DNS server, a transport address for communicating with the apparatus. In one embodiment, the traffic pinhole is limited to allowing traffic initiated from the device to reach the apparatus through the firewall or said network address translator. In one embodiment, said operations include: determining that said received DNS query includes valid authentication information. In one embodiment, the traffic pinhole is through both the firewall and said network address translator. In one embodiment, said operations include: responding to said received DNS query with a transport address received from said network address translator in response to said request to create the traffic pinhole through said network address translator. In one embodiment, the transport address includes an Internet Protocol (IP) address and port number.

One embodiment includes an apparatus, comprising: means for responding to a received DNS query from a domain name system (DNS) server, by requesting a traffic pinhole be created in a firewall or network address translator for allowing traffic initiated from a device, on another side of the firewall or said network address translator from the apparatus, to reach the apparatus. In one embodiment, the traffic pinhole is through said network address translator. One embodiment includes means for responding to said received DNS query by providing, to the DNS server, a transport address received from said network address translator in response to said request to create the traffic pinhole through said network address translator. In one embodiment, the traffic pinhole is through the firewall. One embodiment includes means for responding to said received DNS query by providing, to the DNS server, a transport address for communicating with the apparatus. In one embodiment, the traffic pinhole is limited to allowing traffic initiated from the device to reach the apparatus through the firewall or said network address translator. In one embodiment, said operations include: determining that said received DNS query includes appropriate authentication information prior to said requesting the traffic pinhole be created.

One embodiment includes an apparatus comprising one or more processors and memory, wherein the memory stores one or more instructions that, when executed by said one or more processors, perform operations comprising: in response to receiving a first DNS query for a first device from a second device, sending a second DNS query to the first device requesting the first device update a firewall or a network address translator protecting the first device to allow access to the first device from the second device, with the first and second devices being on different sides of the firewall or the network address translator; and in response to receiving a response, including a transport address, to the second DNS query: responding to the first DNS query by providing the transport address to the second device. In one embodiment, the transport address is provided to the first device by the network address translator. In one embodiment, the second DNS query includes authentication information.

Turning to the figures, FIG. 1A illustrates a network 100 operating according to one embodiment. As shown, network 100 includes a first network 105 and a second network 110, with network address translator and/or firewall 108 in between these two networks (105 and 110). In example network 100, apparatus 101-102 (e.g., apparatus, devices, application servers, etc.) are coupled to network 105; and client devices 111-112 are coupled to network 110. Additionally, Domain Name Service (DNS) server 106 is coupled to networks 105 and 110.

In one embodiment, network address translator 108 provides network masquerading for network 105. Therefore, communications session initiated by client 111 or 112 to reach apparatus 101 or 102 network 110 is blocked; while a communications session initiated by apparatus 101 or 102 to reach client 111 or 112 network is not blocked. In other words, network address translator 108 protects network 105 (including apparatus 101-102) from network 110 (including clients 111-112).

In one embodiment, apparatus 101-102 are natively protected by firewall 108 such that a communications session initiated by client 111 or 112 to reach apparatus 101 or 102 network 110 is blocked; while a communications session initiated by apparatus 101 or 102 to reach client 111 or 112 network is not blocked. In other words, firewall 108 protects network 105 (including apparatus 101-102) from network 110 (including clients 111-112).

In order to allow a communication session to be initiated by a client 111-112 to a protected device such as apparatus 101, one embodiment uses DNS server 106 to notify apparatus 101 of a DNS query for apparatus 101. In response, apparatus 101 requests a communications pinhole (e.g., a non-blocked path, typically limiting the destination to the transport address of apparatus 101 and possibly limiting the source to be a specific transport address of the requesting client 111-112) be created through network address translator and/or firewall 108. In the case of device 108 being a network address translator, network address translator 108 will typically provide a transport address (e.g., Internet Protocol address and port number) to apparatus 101 in response to creating the requested pinhole. Further, in response to the received DNS query from DNS server 106 and in response to the pinhole creation, apparatus 101 will communicate with DNS server acknowledging the creation of the pinhole, and typically provide a transport address (e.g., its native transport address, or one provided to it for its use in response to the pinhole creation) for use in reaching apparatus 101.

In one embodiment, apparatus 101 performs an authentication process to verify that it wants to provide an access pinhole for the requesting device. In one embodiment, apparatus 101 merely checks the source network address of the originating DNS query to determine whether or not it wants to allow access to it. However, it is not uncommon for devices, especially mobile devices, to be dynamically assigned a network address; and therefore, their source address is typically an unknown/changing value. In one embodiment, apparatus 101 registers a name which it does not publicly disclose which allows only those that know its secret name to access apparatus 101. In one embodiment, an authorization code, challenge string, or encoded information is used to verify that the client requesting access to apparatus 101 possesses a valid key, such as by either apparatus 101 decoding a portion of the received DNS query, or apparatus 101 encoding its transport address and requiring the requesting client to decode the response to determine the valid transport code which will provide access through network address translator or firewall 108.

Figure 1B:
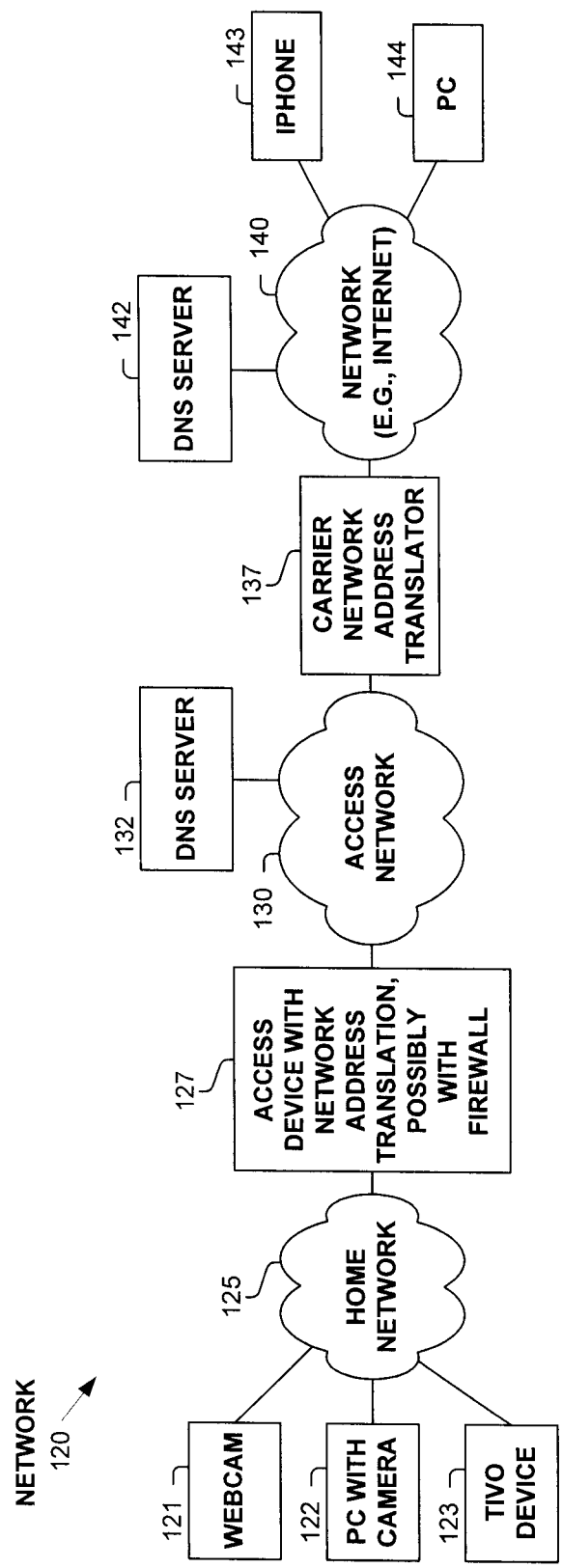
FIG. 1B illustrates a network operating according to one embodiment.

FIG. 1B illustrates a network 120 operating according to one embodiment. As shown, network 120 includes: a home network 125 with exemplary servers 121-123 (e.g., webcam, PC with camera, TIVO device). Home network 125 communicates through access device 127, which performs network address translation and possibly performs firewall functionality, to access network 130. Access network 130 includes DNS server 132 and communicates with network 140 (e.g., the Internet, carrier network, private network, etc.) via carrier network address translator 137. As shown, network 140 includes DNS server 142 and client devices 143-144 (e.g., iPhone 3G, PC).

In one embodiment, each of servers 121-123 initiate and establish a persistent TCP session with DNS server 132, such that DNS server 132 can communicate DNS requests to each of these devices. In one embodiment, a tunnel, another device or one of servers 121-123 is used to consolidate these TCP sessions or provide a single TCP session for use by all of servers 121-123. Each of servers 121-123 registers their name and transport address for allowing DNS server to reach it. In one embodiment, each of servers 121-123 look like a peer DNS server to DNS server 132, or DNS server 132 is modified to perform the relaying of DNS requests, such as according to the description herein or that of FIG. 2.

For example, let's assume that iPhone (143) wishes to access PC with camera 122, such as to look at images from, and possibly control the camera. iPhone (143) provides a DNS query requesting a transport address (e.g., DNS SRV [RFC 2782]) to DNS server 142, which relays the DNS query to DNS server 132. DNS server 132 provides a corresponding DNS query to PC 122, which optionally authenticates the request to determine whether or not to provide access to the requesting client. If the authentication fails, it may provide a negative acknowledgment to DNS server 132 or simply not respond to the DNS query provided to it by DNS server 132.

To provide access to it, PC 122 communicates with carrier network address translator 137 via access device 127 (e.g., network address translator and possibly firewall) to request a pinhole be created for reaching it, typically either for all devices, or the single requesting client. Note, as the request, initiated by pc 122, is being communicated through access device 127 (which is also a network address translator), a pinhole is also created in network address translator 127. In response to the pinhole creation, PC 122 receives a transport address for use in accessing PC 122. In response, PC 122 provides this transport address to DNS server 132, which relays it to DNS server 142, which provides it to iPhone (the requesting client) 143. iPhone now has a transport address which it can use to access PC 122.

Figure 1C:
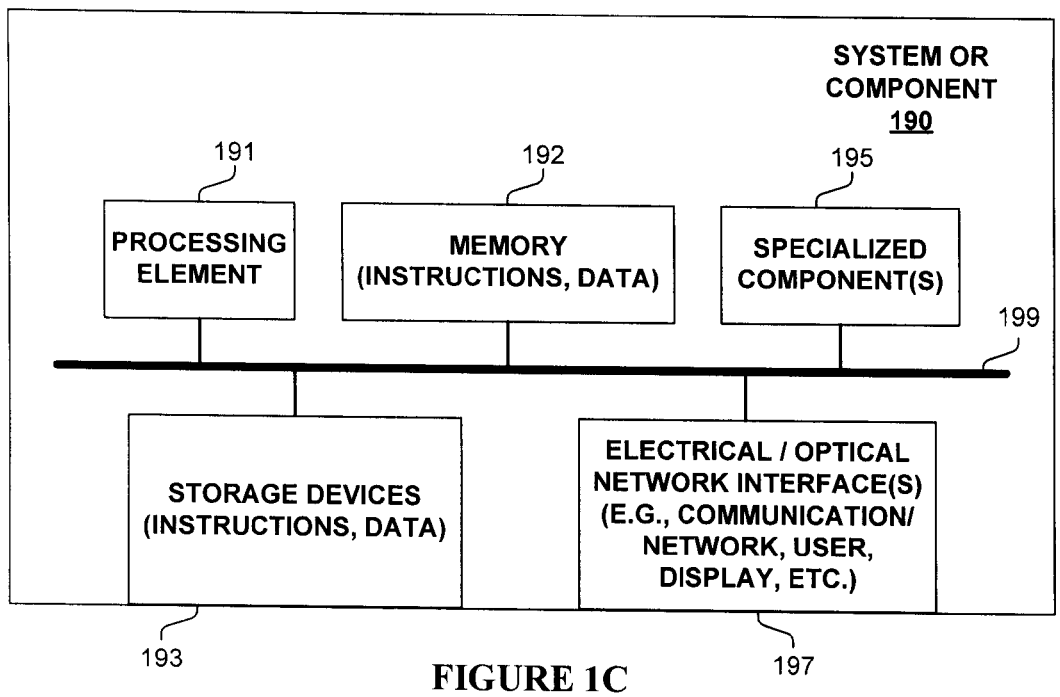
FIG. 1C illustrates an example system or component used in one embodiment.

FIG. 1C is a block diagram of a system or component 190 used in one embodiment associated with a protected device initiating a pinhole through a network address translator and/or firewall to allow access to the protected device in response to a Domain Name System (DNS) query. In one embodiment, system or component 190 is, or is included in, an application server (which requests the creation of the pinhole), or in a DNS server. In one embodiment, system or component 190 performs one or more processes illustrated and/or described herein, possibly including in the message sequence chart illustrated and described herein.

In one embodiment, system or component 190 includes a processing element 191, memory 192, storage devices 193, specialized components 195 (e.g. optimized hardware such as for performing lookup/matching/validation operations, etc.), and interface(s) 197 for communicating information (e.g., sending and receiving packets, user-interfaces, displaying information, etc.), which are typically communicatively coupled via one or more communications mechanisms 199, with the communications paths typically tailored to meet the needs of the application. In one embodiment system or component 190 corresponds to, or is part of, an apparatus 101-102 or DNS server 106 of FIG. 1A, or of an apparatus 121-123 or DNS server 132 of FIG. 1B.

Various embodiments of component 190 may include more or less elements. The operation of component 190 is typically controlled by processing element 191 using memory 192 and storage devices 193 to perform one or more tasks or processes. Memory 192 is one type of computer-readable/computer-storage medium, and typically comprises random access memory (RAM), read only memory (ROM), flash memory, integrated circuits, and/or other memory components. Memory 192 typically stores computer-executable instructions to be executed by processing element 191 and/or data which is manipulated by processing element 191 for implementing functionality in accordance with an embodiment. Storage devices 193 are another type of computer-readable medium, and typically comprise solid state storage media, disk drives, diskettes, networked services, tape drives, and other storage devices. Storage devices 193 typically store computer-executable instructions to be executed by processing element 191 and/or data which is manipulated by processing element 191 for implementing functionality in accordance with an embodiment.

Figure 2:
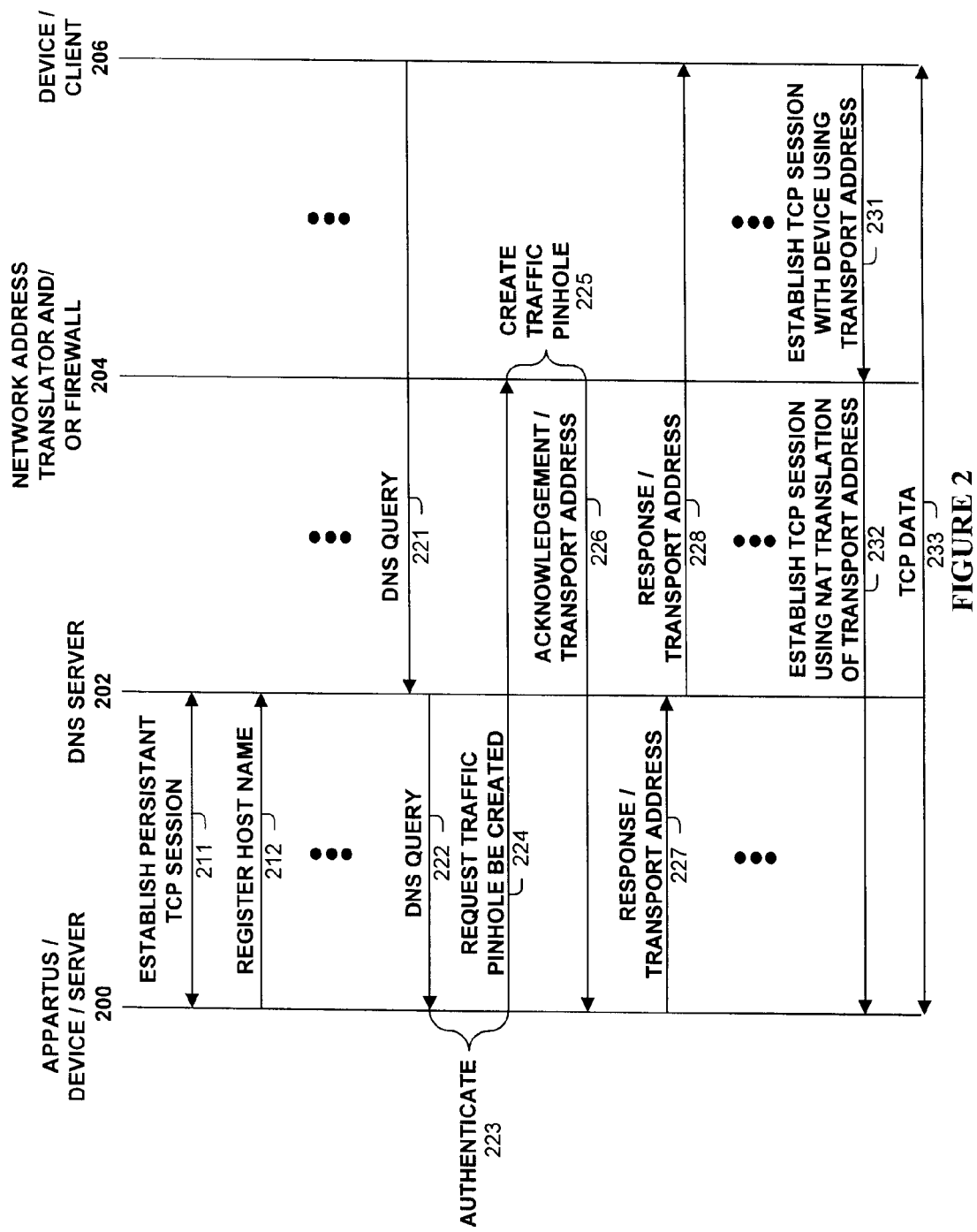
FIG. 2 illustrates a network operating according to one embodiment.

FIG. 2 depicts a message sequence chart illustrating the operation according to one embodiment. Message sequence charts are well-known and often used to illustrate flow of signaling messages between components or systems. FIG. 2 illustrates messages communicated among apparatus/device/server 200, DNS server 202, network address translator and/or firewall 204, and device/client 206.

As shown, initially apparatus 200 establishes (211) a persistent TCP session with DNS server 202, for use by DNS server to reach apparatus 200; and registers (212) its host name with DNS server 202. When apparatus 200 is not protected from DNS server 202 by a firewall or network address translator, one embodiment does not establish the persistent TCP connection as DNS server can initiate communications with apparatus 200.

Next, when client 206 desires to communicate with apparatus 200, client 206 provides (221) a DNS query to DNS server 202. In response, DNS server 202 provides (222) a corresponding DNS query to apparatus 200, such as over an established persistent TCP session or via other means. In one embodiment, apparatus 200 performs authentication (223) of the request, and if authenticated, proceeds with providing access to the requesting client. In response, apparatus 200 requests (224) a traffic pinhole be created through network address translator and/or firewall 204, which is then correspondingly created (225). In response, network address translator and/or firewall 204 provides (226) an acknowledgement and, if a public transport address was created, provides (226) the transport address to apparatus 200 for use in accessing apparatus 200. In response, apparatus 200 provides (226) an acknowledgment response that the pinhole was created to DNS server 202, with this response typically including a transport address, at least in the case where the transport address was newly assigned by network address translator and/or firewall 204. In response, DNS server 202 provides (227) the transport address of apparatus 200 (typically either an originally registered transport address, or the received transport address received 226) to client 206 for initiating communications (231) with apparatus 200.

In response to the received response (227) to the original DNS query (221), client 206 then initiates (231) a TCP session with apparatus 200 through (232) network address translator 204 (illustrating the network address translation functionality), which allows apparatus 200 and client 206 to communicate (233) over the session initiated (231) by client 206.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
   receiving, by a first device, a second domain name system (DNS) query sent from a DNS server in response to a first DNS query from a second device;
   requesting, by the first device in response to said second DNS query, a traffic pinhole be created in a firewall or network address translator for allowing traffic initiated from the second device to access the first device; wherein the first and second devices are on opposite sides of the firewall or said network address translator;
   receiving, by the first device from the firewall or said network address translator, a transport address for the second device to use to access the first device through the traffic pinhole;
   sending, by the first device to the second device, the transport address to use to reach the first device through the traffic pinhole;
   establishing, by the first device at the request of the second device using the transport address, a communications session with the second device through the traffic pinhole; and
   communicating, by the first device with the second device, over the communications session.

2. The method of claim 1, wherein the traffic pinhole is through said network address translator.

3. A method, comprising:
   receiving, by a first device, a second domain name system (DNS) query sent from a DNS server in response to a first DNS query from a second device;
   requesting, by the first device in response to said second DNS query, a traffic pinhole be created in a firewall or network address translator for allowing traffic initiated from the second device to access the first device; wherein the first and second devices are on opposite sides of the firewall or said network address translator; and
   responding to said received second DNS query by providing, to the DNS server, a transport address received from said network address translator in response to said request to create the traffic pinhole through said network address translator;
   wherein the traffic pinhole is through said network address translator.

4. The method of claim 3, wherein the transport address includes an Internet Protocol (IP) address and port number.

5. The method of claim 1, wherein the traffic pinhole is through the firewall.

6. The method of claim 1, wherein the traffic pinhole is limited to allowing traffic initiated from the second device to reach the first device through the firewall or said network address translator.

7. A method, comprising:
   receiving, by a first device, a second domain name system (DNS) query sent from a DNS server in response to a first DNS query from a second device;
   requesting, by the first device in response to said second DNS query, a traffic pinhole be created in a firewall or network address translator for allowing traffic initiated from the second device to access the first device; wherein the first and second devices are on opposite sides of the firewall or said network address translator; and
   responding to said received second DNS query with a transport address received from said network address translator in response to said request to create the traffic pinhole through said network address translator;
   wherein the traffic pinhole is through both the firewall and said network address translator.

8. The method of claim 7, wherein the transport address includes an Internet Protocol (IP) address and port number.

9. A domain name system (DNS) server, comprising:
   one or more processors; and
   memory;
   wherein the memory stores one or more instructions that, when executed by said one or more processors, perform operations comprising:
   in response to receiving, by the DNS server from a second device, a first domain name system (DNS) query initiated by the second device for accessing a first device, sending a second DNS query to the first device requesting the first device update a firewall or a network address translator protecting the first device to allow access to the first device from the second device, with the second device being on a public side and the first device being on a private side of the firewall or the network address translator; and
   in response to receiving a response, including a transport address, to the second DNS query: responding to the first DNS query by providing the transport address to the second device;
   wherein the transport address is provided to the first device by the network address translator.

10. The DNS server of claim 9, wherein the second DNS query includes authentication information.

11. The method of claim 1, comprising: determining that said received second DNS query includes valid authentication information.

12. The method of claim 1, wherein the traffic pinhole is through both the firewall and said network address translator.

13. The method of claim 1, wherein the DNS server is communicatively coupled to the first device and the second device without going through the firewall or said network address translator; and wherein the firewall or said network address translator is communicatively in between the first device and the second device.

14. The method of claim 1, wherein the DNS server is communicatively coupled to the first device through the firewall or said network address translator; and wherein the firewall or said network address translator is communicatively in between the first device and the second device.

15. The method of claim 1, wherein the second device is on the public side of the firewall or said network address translator, and the first device is on the private side of the firewall or said network address translator.

16. A method, comprising:
in response to receiving, by a domain name system (DNS) server from a second device, a first domain name system (DNS) query initiated by the second device for accessing a first device, sending a second DNS query to the first device requesting the first device update a firewall or a network address translator protecting the first device to allow access to the first device from the second device, with the second device being on a public side and the first device being on a private side of the firewall or the network address translator; and
in response to receiving a response, including a transport address, to the second DNS query: responding by the DNS server to the first DNS query by providing the transport address to the second device;
wherein the transport address is provided to the first device by the network address translator.

17. The method of claim 16, wherein the second DNS query includes authentication information.

18. A first device, comprising:
one or more processing elements;
memory; and
one or more network interfaces, configured to receive a second domain name system (DNS) query sent from a DNS server in response to a first DNS query from a second device on an opposite side of a firewall or network address translator from the first device;
wherein said one or more processing elements are configured to perform operations, including: requesting, in response to said second DNS query, a traffic pinhole be created in the firewall or said network address translator for allowing traffic initiated from the second device to access the first device; and responding to said received second DNS query by providing, to the DNS server, a transport address received from said network address translator in response to said request to create the traffic pinhole through said network address translator;
wherein the traffic pinhole is through said network address translator.

19. The first device of claim 18, wherein the second device is on the public side of the firewall or said network address translator, and the first device is on the private side of the firewall or said network address translator.

20. The first device of claim 18, wherein the first device is a server, and the second device is a client.

21. The method of claim 1, wherein the first device is a server, and the second device is a client.

22. The method of claim 1, wherein said sending, by the first device to the second device, the transport address to use to reach the first device through the traffic pinhole includes sending the transport address to the DNS server for relaying to the second device.

23. The method of claim 22, wherein the first device is a server, and the second device is a client.

* * * * *